United States Patent [19]
Ahlenius et al.

[11] Patent Number: 5,490,285
[45] Date of Patent: Feb. 6, 1996

[54] METHOD OF TOPOGRAPHICALLY DISPLAYING SELECTED INFORMATION IN A CELLULAR COMMUNICATION SYSTEM

[75] Inventors: Mark T. Ahlenius, Lombard; Dennis R. Schaeffer, Buffalo Grove, both of Ill.

[73] Assignee: Motorola, Inc., Schaumburg, Ill.

[21] Appl. No.: 63,830

[22] Filed: May 20, 1993

[51] Int. Cl.$^6$ ........................................................ H04Q 7/00
[52] U.S. Cl. .................. 455/33.1; 455/56.1; 455/67.7; 379/59
[58] Field of Search .................. 345/145, 146, 345/117; 455/67.1, 67.7, 53.1, 226.4, 158.4, 159.1, 155.1, 33.1, 67.3, 56.1; 379/58, 59, 63

[56] References Cited

U.S. PATENT DOCUMENTS

| | | | |
|---|---|---|---|
| 5,023,900 | 6/1991 | Tayloe et al. | 379/59 |
| 5,134,709 | 7/1992 | Bi et al. | 455/33.1 |
| 5,179,722 | 1/1993 | Gunner et al. | 455/67.7 |
| 5,247,699 | 8/1993 | Hartman | 455/33.1 |
| 5,283,640 | 3/1994 | Gunmar et al. | 455/33.1 |
| 5,307,510 | 4/1994 | Gunner et al. | 455/226.4 |

*Primary Examiner*—Edward F. Urban
*Attorney, Agent, or Firm*—Anthony G. Sitko

[57] ABSTRACT

A method is provided of topographically displaying selected information of a plurality of cells within a cellular communication system through a display device. The method includes the steps of accessing the selected information from an information database and correlating the selected information to respective cells of the plurality of cells. The method further includes the step of creating a topographical display of the plurality of cells of the cellular system through the use of representative polygons, with each polygon representing a service coverage area of a cell of the plurality of cells and displaying the selected information as visually variable values within the representative polygons of the topographical display.

6 Claims, 3 Drawing Sheets

5,490,285

METHOD OF TOPOGRAPHICALLY DISPLAYING SELECTED INFORMATION IN A CELLULAR COMMUNICATION SYSTEM

FIELD OF THE INVENTION

The field of the invention relates to cellular communication systems and, in particular, to methods of displaying selected information within a cellular system.

BACKGROUND OF THE INVENTION

Cellular communication systems and reuse of radio frequency channels within such systems are known. Channel reuse is important because of the limited number of channels available and because of the large number of users. Reuse of communication channels within a cellular system is limited to areas where sufficient distance exists among reusing radios such that interference is maintained below an acceptable level.

Frenkiel (U.S. Pat. No. 4,144,411) provides one method of reusing communication channels among a number of cell sites. Under Frenkiel, narrow-beam antennas allow seven cells per subarray before use of a channel is repeated in a cellular system. The seven cell subarray is repeated across a communication system.

Under Frenkiel three 120-degree directional antennas are located at a center of a cell. The three 120-degree directional antennas divide the cell into three sectors. In accordance with the Frenkiel invention, each of the sectors are allocated one or more communications channels and a given number of cells are used to form a subarray for providing communication access through a predetermined number of communication channels. The communication channel allocations are repeated from subarray to subarray.

While the method provided by Frenkiel works well over a flat, homogeneous, idealized terrain, difficulties are often experienced in more hostile terrain, where barriers interrupt the orderly repetition of subarrays based upon some regularly presumed (co-channel) interference level. To accommodate barriers such as hills or tall buildings, a base site of a cell is often moved to a more convenient location, such as to the top of a building or hill. The use of a more convenient location often increases interference and disrupts the reuse pattern resulting in less efficient use of communication resources. Where a base site is located at the top of a hill, the elevation may result in mutual interference between the base site on the hill and base sites located around the hill.

Mutual interference within a communication system is closely related to the topology of the terrain in which the system is to be used. The efficient use of communication channels, on the other hand, is closely related to reusing channels as close together, geographically, as possible. Where because of terrain, or otherwise, the orderly layout of base sites is disrupted, then the spacing and assignment of channels becomes more difficult, often requiting a trial-and-error approach. Because of the importance of communication systems a need exists for a more convenient method of displaying attributes of a communication system in a manner that relates such information to a geographic context.

SUMMARY OF THE INVENTION

A method is provided of topographically displaying selected information of a plurality of cells within a cellular communication system through a display device. The method includes the steps of accessing the selected information from an information database and correlating the selected information to respective cells of the plurality of cells. The method further includes the step of creating a topographical display of the plurality of cells of the cellular system through the use of representative polygons, with each polygon representing a service coverage area of a cell of the plurality of cells and displaying the selected information as visually variable values within the representative polygons of the topographical display.

DETAILED DESCRIPTION OF THE PREFERRED EMBODIMENT

The solution to the problem of displaying attributes (selected information) of elements of a cellular communication system in a manner that relates the selected information to a geographic context lies conceptually in generating a topographical display of the cellular system on a display device (e.g., a cathode ray tube (CRT)) and overlaying the selected information as a series of visually variable values (e.g. variable color, or grey scale). Under one embodiment of the invention the topographical display consists of a set of polygons (e.g., hexagons) representing the service coverage areas of individual cells of the system. Cells having similar attributes relative to the selected information attribute have a similar color value. The relative magnitude of the selected information may be displayed by a color continuum (e.g., blue may represent a relatively low value while red may represent a relatively high value). Other attributes not requiring a display of magnitude (such as channel reuse) may be represented as a indicative color overlaid on reusing cells.

Figure 4:
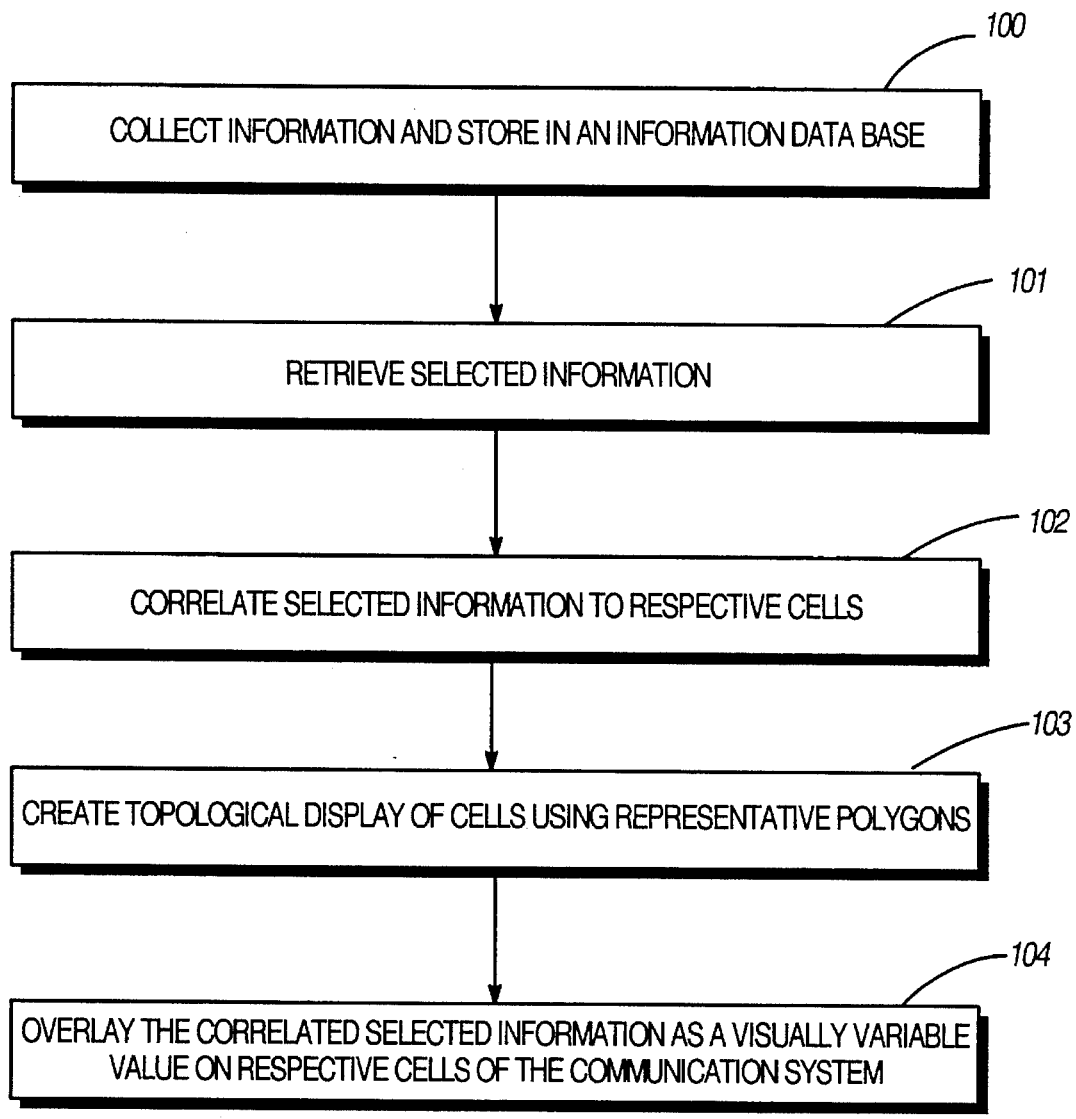
FIG. 4 is a flow chart of information display in accordance with one embodiment of the invention.

FIG. 4 is a flow chart of a method of displaying the selected information within the cellular system in accordance with one embodiment of the invention. Reference will be made to FIG. 4 as appropriate to understanding the invention.

Information (e.g., cell loading, reuse, interference, etc.) for display within the topographical representation 10 may be collected automatically by a computer, by simulations, or manually at an operations and maintenance center (OMC) and stored 100 in an information database (not shown). Mutual interference in accordance with one embodiment of the invention may be determined in a number of ways. One way is through the use of simulation programs that take into account terrain and obstructions such as buildings or bridges. Mutual interference may also be gathered empirically through measurement. Interference values are stored in the information database and retrieved for display as color values on the CRT.

Figure 1:
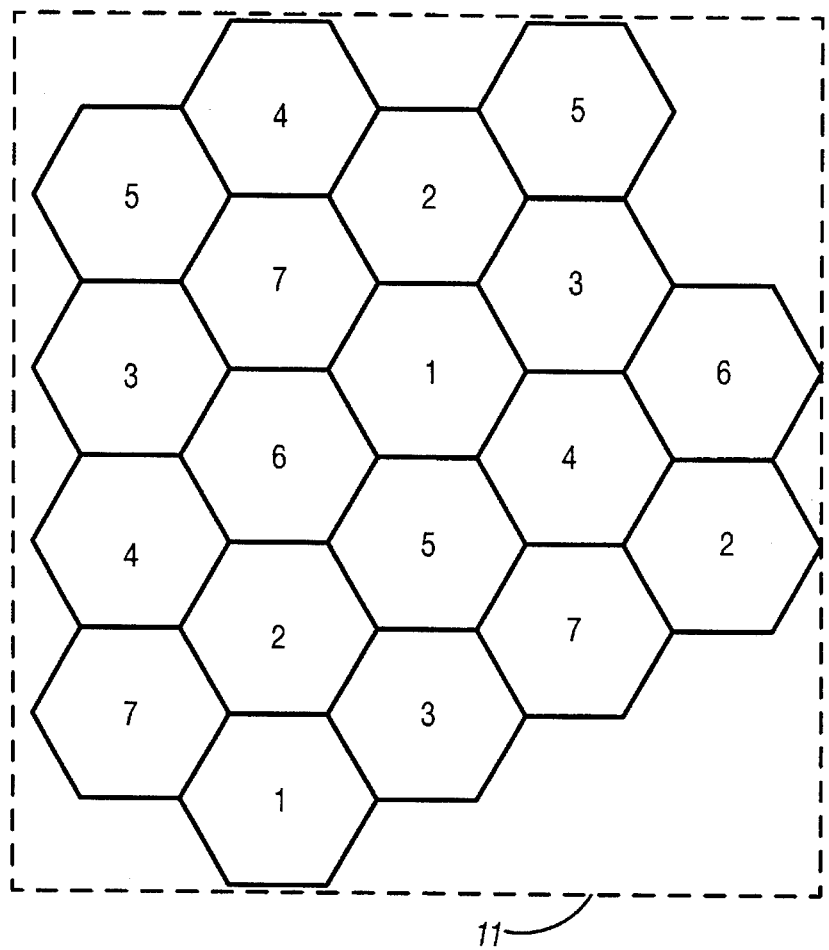
FIG. 1 is a depiction of a cellular communication system on a CRT in accordance with one embodiment of the invention.

FIG. 1 is a topographical representation 10 of a cellular system used for display of selected information in accordance with one embodiment of the invention. The repeating set of polygons 1–7 represents cells of the communication system reusing a particular communication channel (e.g. as taught by Frenkiel in U.S. Pat. No. 4,144,411). Such a system is created 103 and displayed on a color display device (e.g., a color CRT 11).

Figure 2:
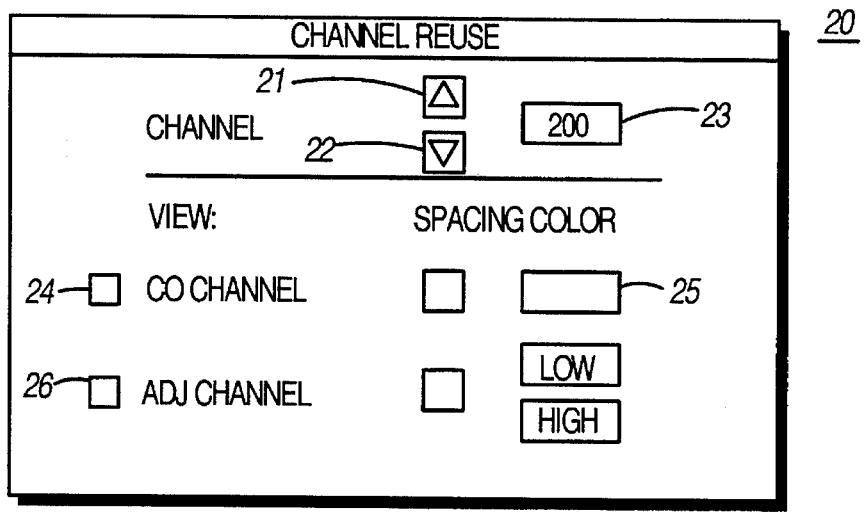
FIG. 2 depicts a menu for selecting information for display on a CRT in accordance with one embodiment of the invention.

Selected information from the database may be retrieved 101 by a database interface program that not only retrieves the selected information but also correlates 102 the selected information to respective cells of the cellular communication system. Selection of an attribute, such as channel reuse, under a reuse mode, may be accomplished through the pull-down menu 20, FIG. 2, displayed on the CRT 11. A channel is selected under one embodiment by activating directional buttons 21 or 22. The selected channel is shown in a channel display 23.

The display of reusing cells 1–7 is accomplished by activating a cochannel button 24. Upon activation of the cochannel button 24 the database interface program retrieves the selected information and correlates the selected information to the polygons 1–7. Upon activation of the button 24 the reusing cells 1-7 of the channel of the display 23 are highlighted with a color value 25 shown within the menu 20.

The display of cochannel interference, under an interference mode, within such a system 10 is accomplished through the use of a "mouse" (not shown) by moving a pointer on the CRT to a selected cell and selecting the cell through activating and holding a switch on the "mouse". Selection of a cell is reflected by overlaying a grey scale on the selected cell. Mutual interference between the selected cell and reusing cells is displayed by overlaying a color value on reusing cells indicative of a measured interference. Toggling between displays of interference and reusing base sites is accomplished by pressing and releasing the switch on the "mouse".

Figure 3:
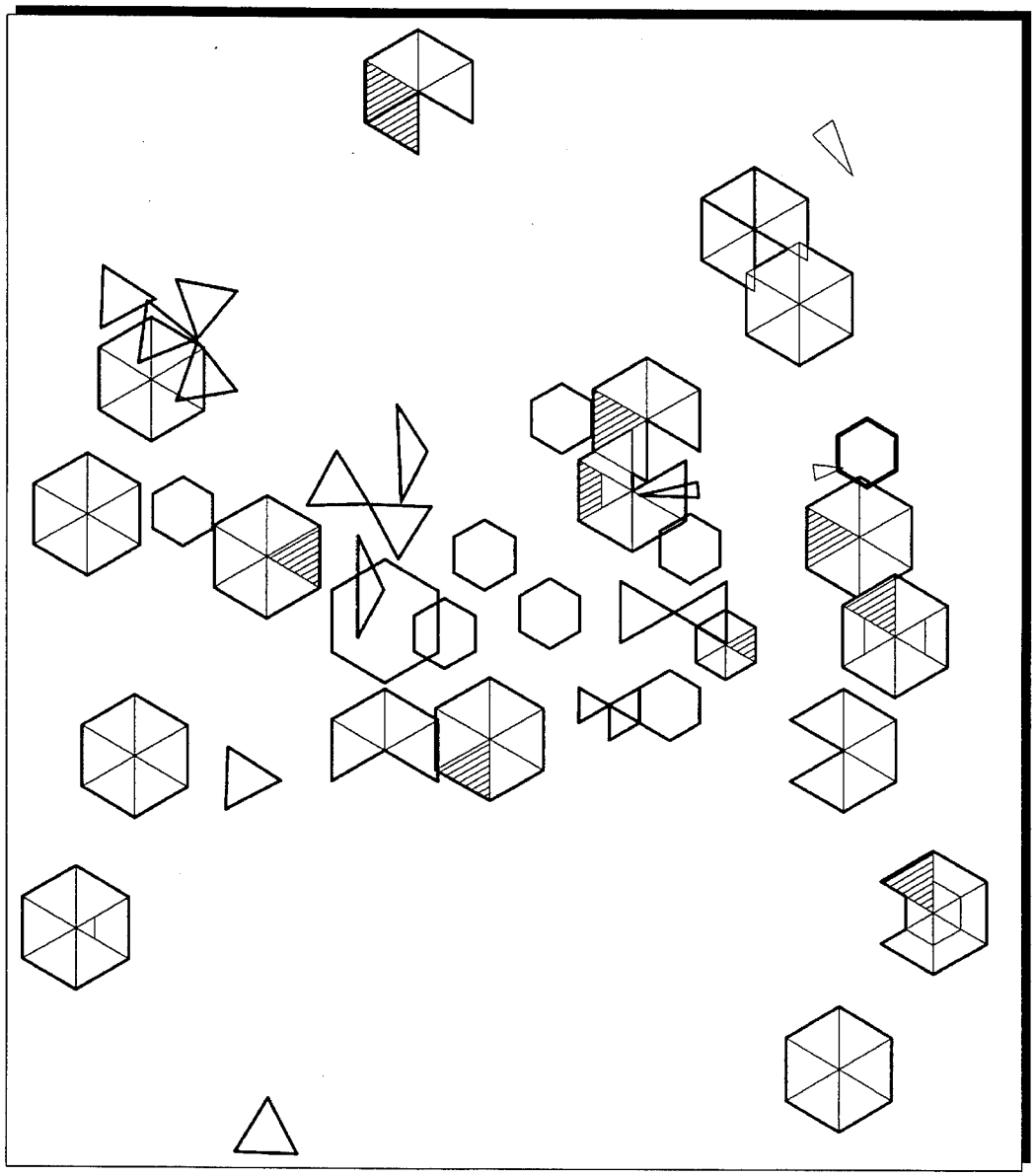
FIG. 3 is a display of selected information in accordance with one embodiment of the invention.

In another embodiment of the invention (FIG. 3) a communication system including a number of overlapping service coverage areas may be advantageously displayed by reducing the size of the polygons while retaining the relative location of base sites within the display 10. Reducing the size of the polygons allows for an increase in the volume of information that may be displayed within the display 10 while maintaining the geographic context of the displayed information.

In another embodiment of the invention adjacent channel information may be displayed by coloring the borders of the polygons of the display 10. Under such an embodiment blue may be used to indicate the use of a channel below the channel shown in the channel readout 23. A red border may be used to indicate use of a channel above that displayed in the channel readout 23. Reusing channels, under such an embodiment, may have a black border.

The display of adjacent channel information is accomplished by activating an adjacent channel button 26. In the reuse mode, a solid colored body of a polygon 1–7 indicates a reusing cell. A polygon with a red or blue border indicates the use of an adjacent channel by the cell 1–7.

In the interference mode a red or blue border may be used to indicate the channel reference. Where the color of the interference displayed within the polygon is coincident with the color of the border, the border may be displayed as a dashed line or may flash.

The many features and advantages of this invention are apparent from the detailed specification and thus it is intended by the appended claims to cover all such features and advantages of the system which fall within the true spirit and scope of the invention. Further, since numerous modifications and changes will readily occur to those skilled in the art (e.g., selection of a base site without toggling), it is not desired to limit the invention to the exact construction and operation illustrated and described, and accordingly all suitable modifications and equivalents may be resorted to, falling within the scope of the invention.

It is, of course, to be understood that the present invention is, by no means, limited to the specific showing in the drawing, but also comprises any modification within the scope of the appended claims.

We claim:

1. A method of displaying on a display device selected information of a communication system having a plurality of coverage areas comprising:

creating a graphical display of the communication system with the plurality of coverage areas indicated by representative polygons;

selecting a communication channel of a plurality of communication channels in the communication system;

identifying coverage areas to which the communication channel is assigned by coloring the representative polygon a first color;

selecting one of the identified coverage areas;

identifying coverage areas having a communication system performance characteristic affected by assignment of the communication channel to the selected one of the coverage areas by coloring the representative polygon a second color.

2. The method of claim 1 wherein the step of identifying coverage areas having a communication system performance characteristic affected by assignment of the communication channel to the selected one of the coverage areas comprises representing a degree of affect by coloring the representative polygon a variable color value.

3. The method of claim 1 further comprising the step of identifying coverage areas having assigned communication channels which are adjacent to the selected communication channel by coloring the representative polygon a third color.

4. The method of claim 3 wherein the step of identifying coverage areas to which the communication channel is assigned comprises coloring a border of the representative polygon a first color; and the step of identifying coverage areas having assigned communication channels which are adjacent to the selected communication channel comprises coloring the a border of the representative polygon a third color.

5. The method of claim 4 wherein the step of identifying coverage areas having a communication system performance characteristic affected by assignment of the communication channel to the selected one of the coverage areas comprises representing a degree of affect by coloring an interior of the representative polygon a variable color value.

6. The method of claim 1 wherein the step of creating a graphical display of the communication system with the plurality of coverage areas indicated by representative polygons further comprises reducing the size of the representative polygons while retaining of a relative location of the polygons representative of the communication system.

* * * * *